United States Patent
Blase

[11] Patent Number: 5,711,733
[45] Date of Patent: Jan. 27, 1998

[54] POWER TRANSMISSION CHAIN

[75] Inventor: Günter Blase, Bergisch Gladbach, Germany

[73] Assignee: Igus Spritzgussteile Fur Die Industrie GmbH, Köln, Germany

[21] Appl. No.: 586,699
[22] PCT Filed: Jul. 26, 1994
[86] PCT No.: PCT/DE94/00868
§ 371 Date: Jan. 25, 1996
§ 102(e) Date: Jan. 25, 1996
[87] PCT Pub. No.: WO95/04231
PCT Pub. Date: Feb. 9, 1995

[30] Foreign Application Priority Data

Jul. 28, 1993 [DE] Germany ............ 43 25 259.1

[51] Int. Cl.$^6$ ............................................. F16G 13/02
[52] U.S. Cl. ........................... 474/227; 474/228; 474/234
[58] Field of Search ............................ 474/202, 206, 474/226–228, 230–232, 234

[56] References Cited

U.S. PATENT DOCUMENTS

| | | |
|---|---|---|
| 191,211 | 5/1877 | Westinghouse ............ 474/230 |
| 3,503,579 | 3/1970 | Kurlandsky ............ 248/51 |
| 4,104,871 | 8/1978 | Moritz . | 
| 4,590,961 | 5/1986 | Schumann . |
| 4,625,507 | 12/1986 | Moritz et al. ............ 474/206 X |
| 4,626,233 | 12/1986 | Moritz ............ 474/206 |
| 4,813,224 | 3/1989 | Blase ............ 474/206 X |

FOREIGN PATENT DOCUMENTS

| | | |
|---|---|---|
| 0154882 | 9/1985 | European Pat. Off. . |
| 1775585 | 4/1972 | Germany . |
| 2357908 | 5/1975 | Germany . |
| 2415374 | 10/1975 | Germany . |
| 2728442 | 1/1978 | Germany . |
| 3025838 | 2/1981 | Germany . |
| 3431531 | 3/1986 | Germany . |
| 3531066 | 3/1987 | Germany . |
| 3929095 | 3/1991 | Germany . |
| 1194161 | 6/1970 | United Kingdom . |

*Primary Examiner*—Roger J. Schoeppel
*Attorney, Agent, or Firm*—Browdy and Neimark

[57] ABSTRACT

It is envisaged in the case of a power transmission chain (1) for guiding cables, hoses and the like in a cavity surrounded by the chain links, with several chain straps (2, 3) which can be connected in detachable fashion by upper and lower cross-members, which are assembled to form two parallel strands, overlap each other and can be angled in relation to each other, and which interlock positively in the area of the mutual overlap, that each of the parallel chain strands includes inner straps (2) and outer straps (3). Each outer strap (3) overlaps two inner straps (2). The areas of the chain straps (2, 3) which are intended to overlap the adjacent chain straps (2, 3) are arranged in a common plane which roughly forms the mid-length plane of the chain straps (2, 3). (FIG. 1)

3 Claims, 7 Drawing Sheets

POWER TRANSMISSION CHAIN

FIELD OF THE INVENTION

The invention relates to a power transmission chain for guiding cables, hoses and the like, with several chain straps which can be connected in detachable fashion by upper and lower cross-members, which are assembled to form two parallel strands, overlap each other and can be angled in relation to each other, and which interlock positively in the area of the mutual overlap.

REVIEW OF RELATED TECHNOLOGY

A power transmission chain of this kind is known, for example, from DE 35 31 066. In the case of the power transmission chain described there, the individual chain links are formed by the outer sides of the chain straps each being provided with a protruding peg which engages a circular recess provided on the inner side of the next chain link. This permits interlocking of consecutive chain links. Each chain strap displays a hole pointing inwards and a peg pointing outwards. In order to permit interlocking of the individual chain links, the two areas of a chain strap which are intended to overlap a neighbouring chain strap are off-set in relation to each other or arranged in staggered fashion. The chain strap is offset roughly halfway along the pitch length of the chain link.

The individual components of such an energy transmission chain are injection moulded from thermoplastic material in one piece. The injection moulds, especially those for manufacturing the chain straps, are relatively expensive. The more complicated the design of these moulds, the more expensive they become.

The known power transmission chain has the disadvantage that the injection moulds for manufacturing the chain links are very expensive on account of the relatively complicated design. Furthermore, the stability of the chain strand is not always sufficient in the case of large chain links under high loads. A disadvantage of offset side-straps is that, when force is applied in the direction of pull of the chain, the force is deflected and the offset represents a weak-point. The greater the surface area of the parts, and the thicker they are, the more difficult it becomes to manufacture them, as distortion and warping occur as a result of the moulding process (e.g. cooling in the mould), particularly at the transition points between thick and thin strap areas or at the offsets. This leads to inaccuracies along the entire length of the chain, as well as to instability.

Therefore, the task of the present invention is to create a power transmission chain of the type mentioned an the beginning, which is easy and inexpensive to manufacture and which is also inherently stable and free of distortion.

SUMMARY OF THE INVENTION

According to the invention, the task is solved by the fact that the areas of each chain strap which are intended to overlap the neighbouring chain straps are arranged in a common plane, that the same side of each chain strap is positioned on the adjacent chain straps and that the chain straps of the opposite strands are arranged mirror-symmetrically to each other in relation to the plane running parallel to the strap sides and through the longitudinal axis of the power transmission chain. This results in each strap strand advantageously comprising inner straps and outer straps arranged in parallel planes. The outer straps, held together by means of upper and lower cross-members, can thus be solely responsible for the integrity of the entire chain strand.

The chain straps can be designed mirror-symmetrically, at least in relation to the plane running through the center of the chain strap perpendicularly to the longitudinal axis of the chain.

It is unnecessary to offset the chain link. In the simplest case, the chain link can be designed as a plate provided with two holes or two pegs. The power transmission chain thus formed can absorb particularly high forces in the longitudinal direction, because the chain strand mainly held together by the outer straps is particularly stable.

Due to the fact that the outer straps joined by cross-members are mainly responsible for the integrity of the chain, every second upper and/or lower cross-member in the longitudinal direction of the chain can be dispensed with should it prove necessary.

Each chain strap is preferably provided with areas of greater thickness which fill the gaps between the chain straps arranged in overlapping fashion and lie approximately flush with the respective adjacent chain strap. This results in smooth inner and outer surfaces, where continuous and smooth inner surfaces are particularly advantageous for guiding the cables located inside due to the fact that the cables encounter no chafing points on these surfaces.

In one embodiment of the invention, inward-facing studs are provided for receiving the cross-members, said studs being arranged roughly in the area halfway along the pitch length of the chain strap and every second stud of a strap strand protruding between and beyond two chain straps overlapping the chain strap in question. The studs can be designed in a familiar manner so that the cross-members snap into place.

The width of the cross-members can be dimensioned in such a way that every second cross-member overlaps two chain straps arranged in the same plane. This affords the chain strand added stability and prevents the mutually overlapping areas of the chain straps from being forced apart in the event of extreme loads. The studs are expediently arranged in the area of the thick areas of the chain straps. This increases the flexural strength of the studs and is advantageous if the power transmission chains are exposed to loads not in accordance with the intended purpose, e.g. on building sites.

In one embodiment of the invention, in which the chain straps display matching guide ribs and guide recesses in the area of their mutual overlap, where the guide ribs display stop faces and the guide recesses display stops, the stops and stop faces are each provided with a slight undercut. The undercut causes the guide ribs and guide recesses to be drawn together in the event of angling and when the chain strand is subjected to a load. The combination of outer straps and inner straps makes it unnecessary to establish a claw-like connection of the stop to the stop face, as practised to date in accordance with the prior art.

BRIEF DESCRIPTION OF THE DRAWING FIGURES

The invention is described below on the basis of a practical example with reference to the associated drawings. In this context, the drawings show the following:

FIG. 1 A top plan view of a segment of a power transmission chain according to the invention, FIG. 2 The inner side of an inner strap, FIG. 3 The outer side of an inner strap, FIG. 4 An enlarged partial cross-section view along Line IV in FIG. 3, FIG. 5 An upper view of an inner strap, FIG. 6 The inner side of an outer strap, and FIG. 7 The outer side of an outer strap.

FIG. 8 A perspective view of the invention.

DETAILED DESCRIPTION OF THE PREFERRED EMBODIMENT

Figure 1:
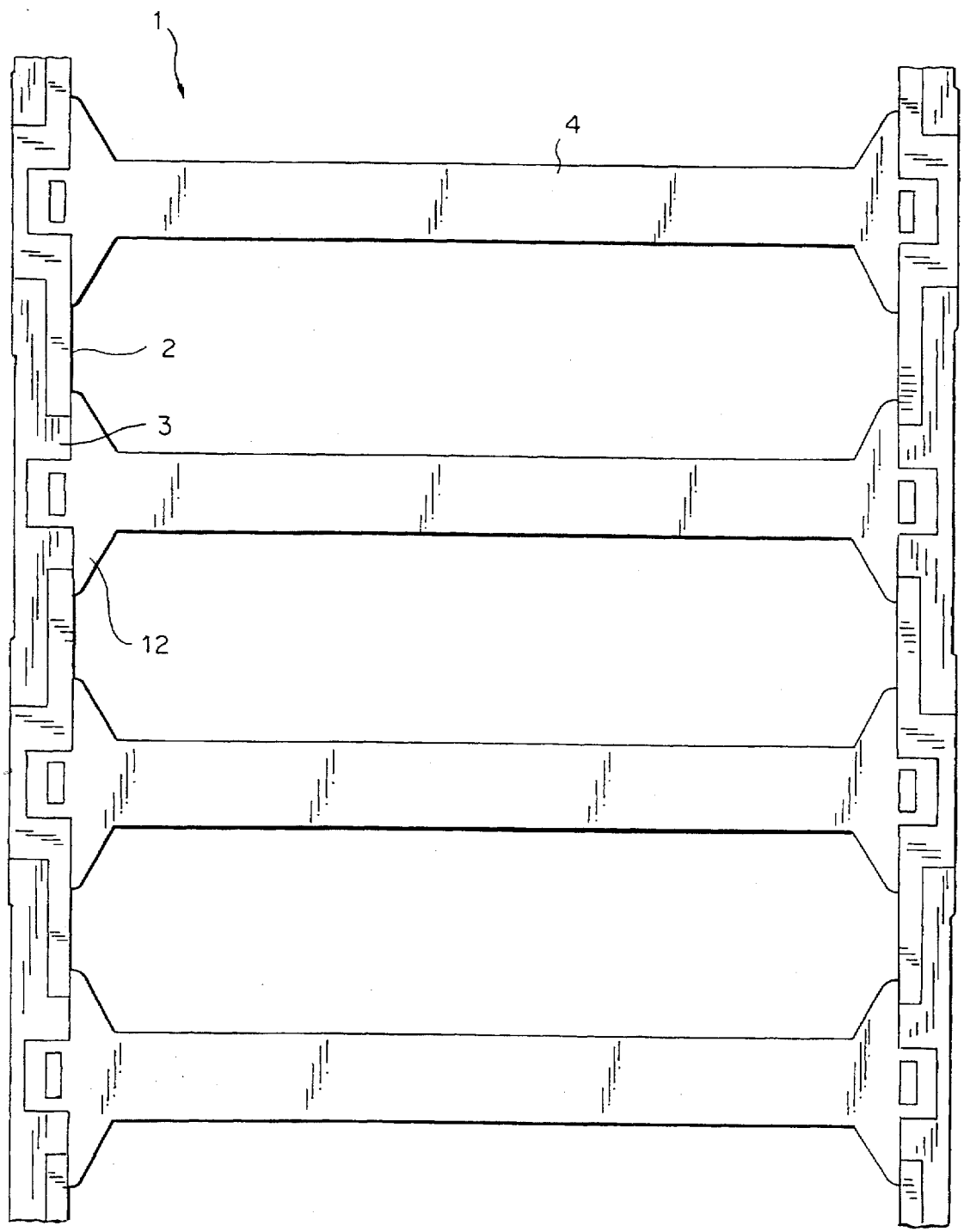

As can be seen from the drawing, particularly FIG. 1, the power transmission chain 1 according to the invention essentially comprises the side straps 2, 3 and the cross-members 4 holding the side straps 2, 3 together. The inner strap is designated with reference number 2 and the outer strap with reference number 3. The cross-members 4 can be snapped in place in locking fashion on inward-facing studs 5 on the chain straps 2, 3 in the familiar manner.

Figure 3:
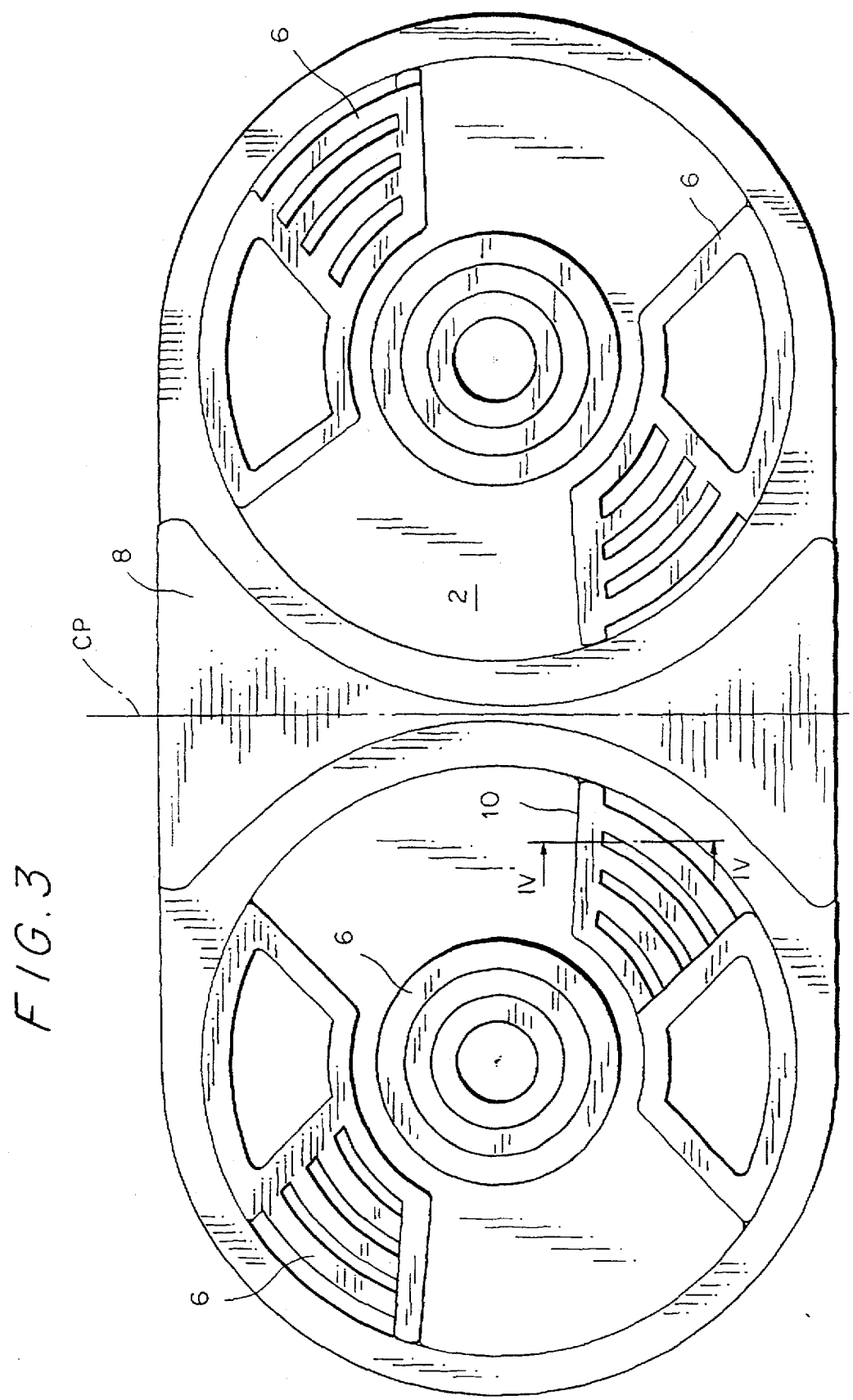
Figure 6:
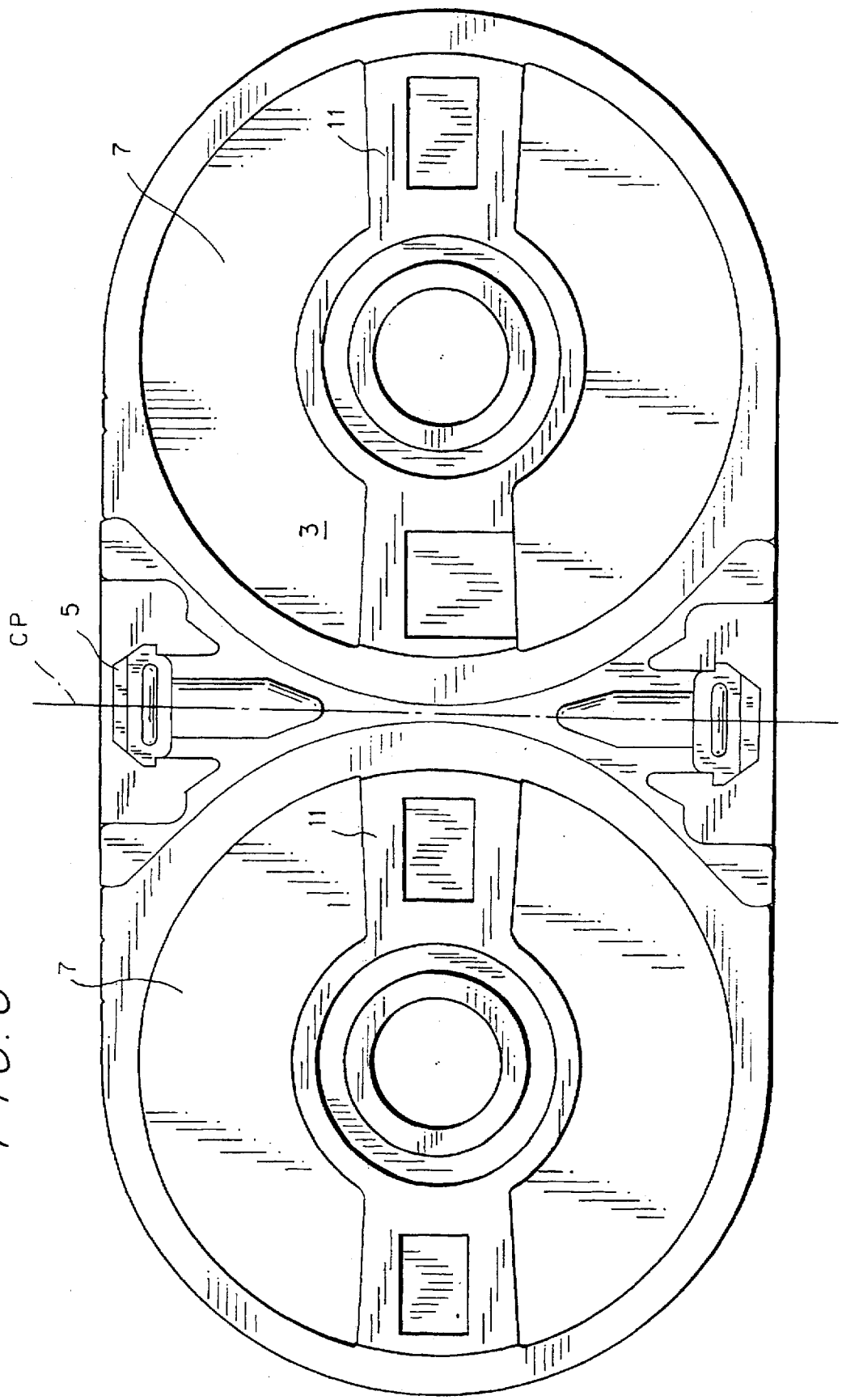
Figure 7:
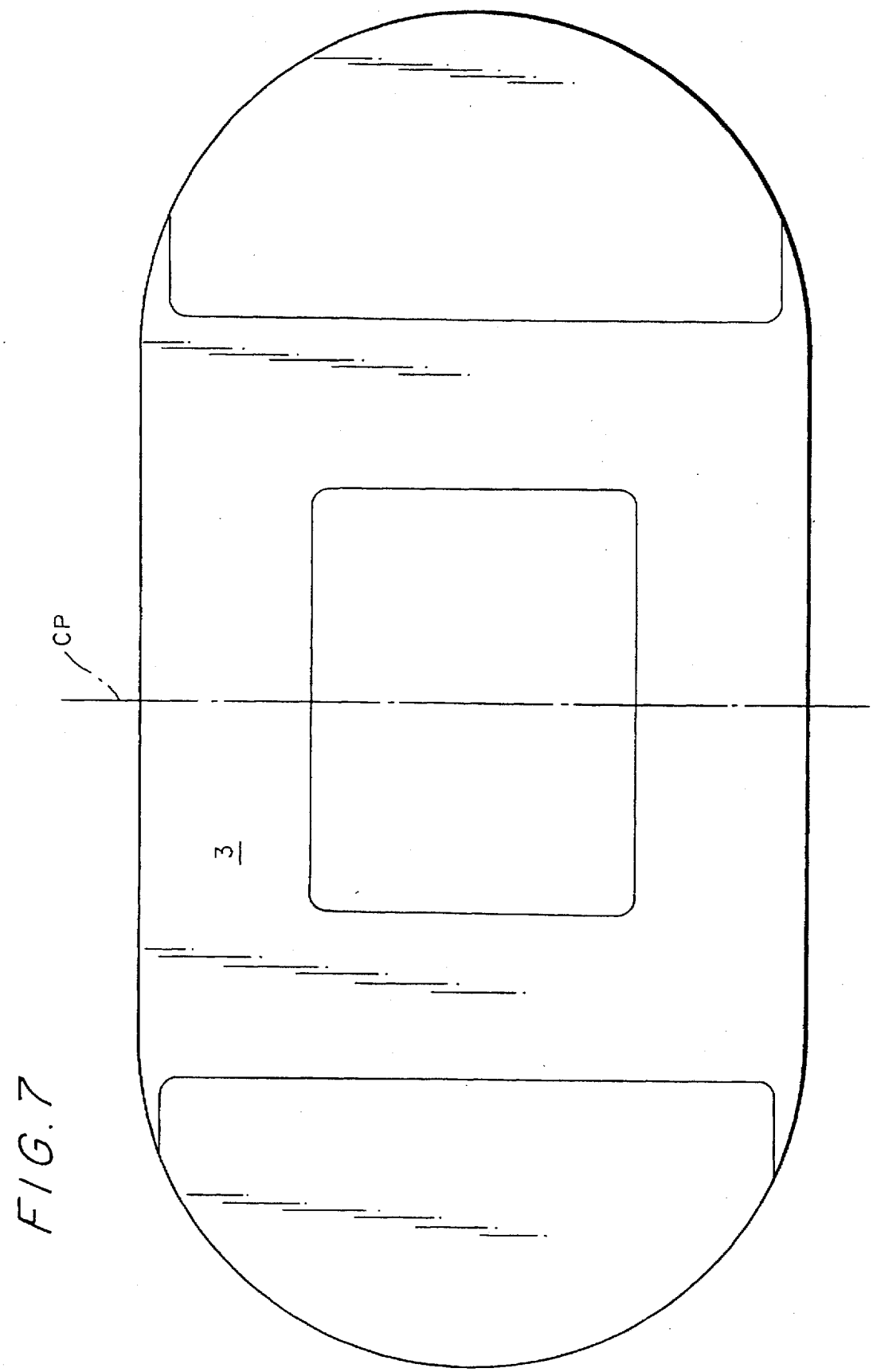
Figure 8:
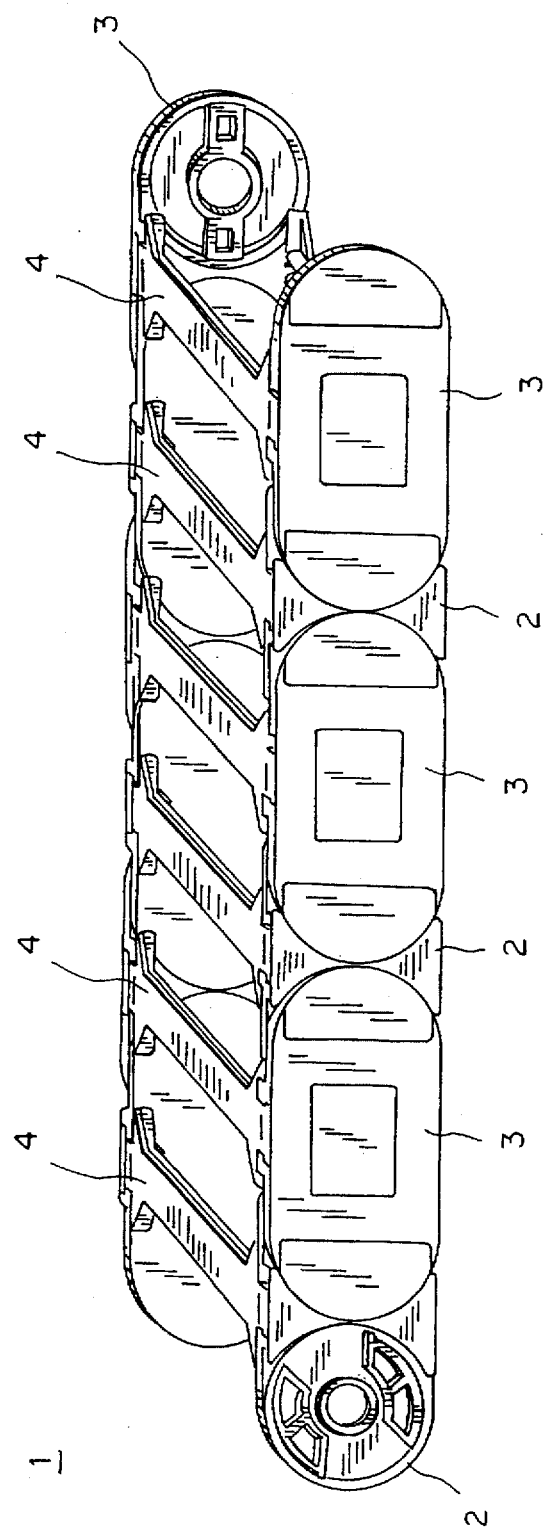

As can be seen from FIGS. 3 and 6, the outer side of the inner strap 2 is provided with guide ribs 6, which are designed to fit positively into the guide recesses 7 provided on the inner side of the outer strap 3. When the chain straps 2, 3 are joined together, an inner strap 2 is always overlapped by two outer straps 3. In this context, each chain link overlaps the adjacent chain links 2, 3 on the same side. The guide ribs 6 and the guide recesses 7 engage in such a way that the chain straps 2, 3 can be pivoted relative to each other to a limited extent. Both the inner strap 2 and the outer strap 3 are designed in such a way that they mirror each other in two planes of symmetry. Of particular importance in this context is the fact that the chain straps 2, 3 are mirror-symmetrical as regards the plane extending perpendicularly to the longitudinal axis of the power transmission chain 2, 3 at the center of the respective chain straps. This plane is denoted herein as the center plane CP and is indicated by a dot-dash line throughout the drawing. This renders it possible to use each chain strap 2, 3 on each side of the power transmission chain 1.

Figure 5:
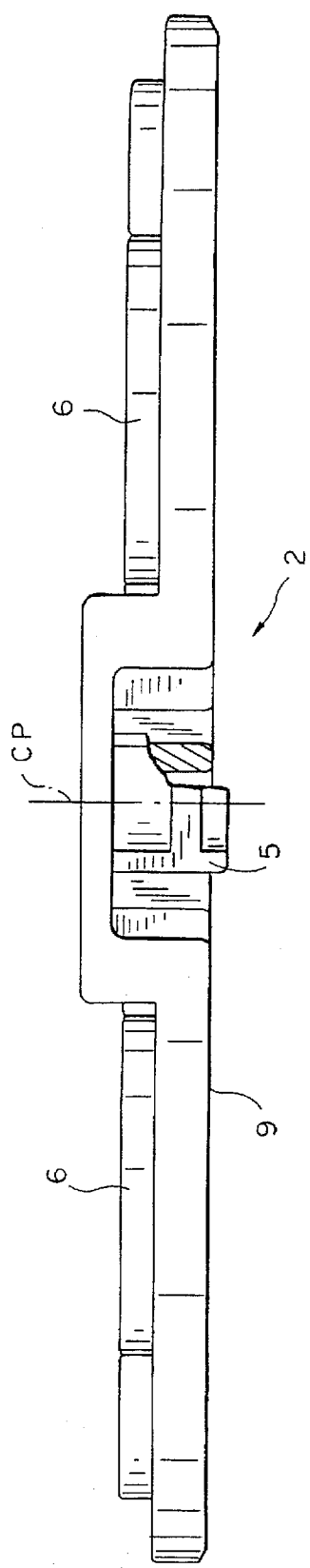

As can be seen from FIG. 5, the areas of a chain strap 2, 3 which are intended to overlap an adjacent chain strap 2, 3 and thus form a hinged connection lie in a common plane. This common plane roughly forms the mid-length plane of the chain straps 2, 3.

A thicker area 8 is provided roughly halfway along the pitch length of the chain straps 2, 3, which are injection moulded in one piece from plastic. This thicker area 8 fills the gap between the mutually overlapping chain straps 2, 3 in the assembled power transmission chain 1.

Figure 2:
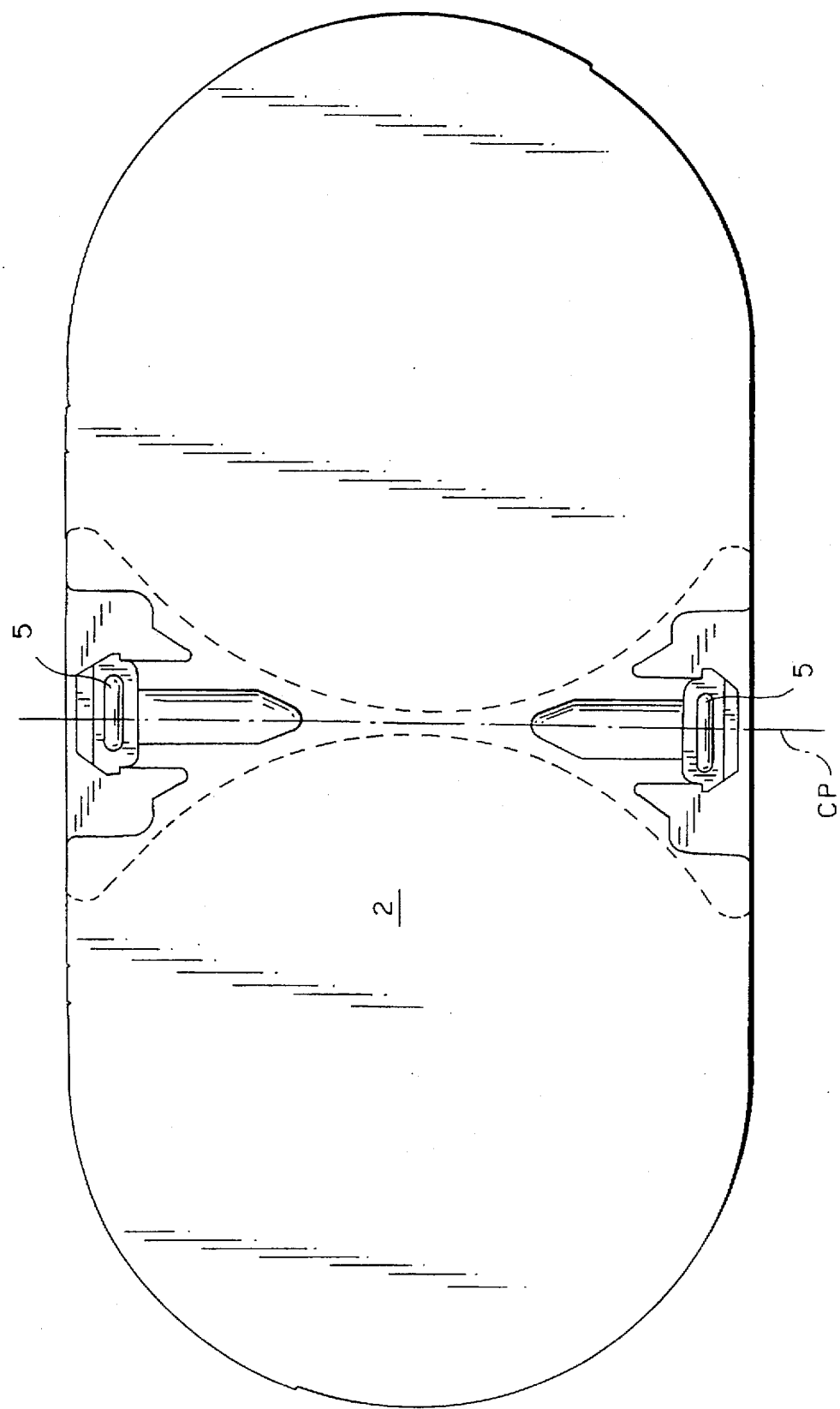

As can be seen from FIGS. 2 and 5, the studs 5 in the thicker area 8 are recessed in relation to the inward-facing area 9 of the chain straps 2, 3. This has the advantage, on the one hand, that the cross-members 4 located on the studs 5 can absorb higher forces and, on the other hand, the studs 5 do not protrude too far into the interior of the power transmission chain 1, so that hoses and cables can be inserted without hindrance.

Figure 4:
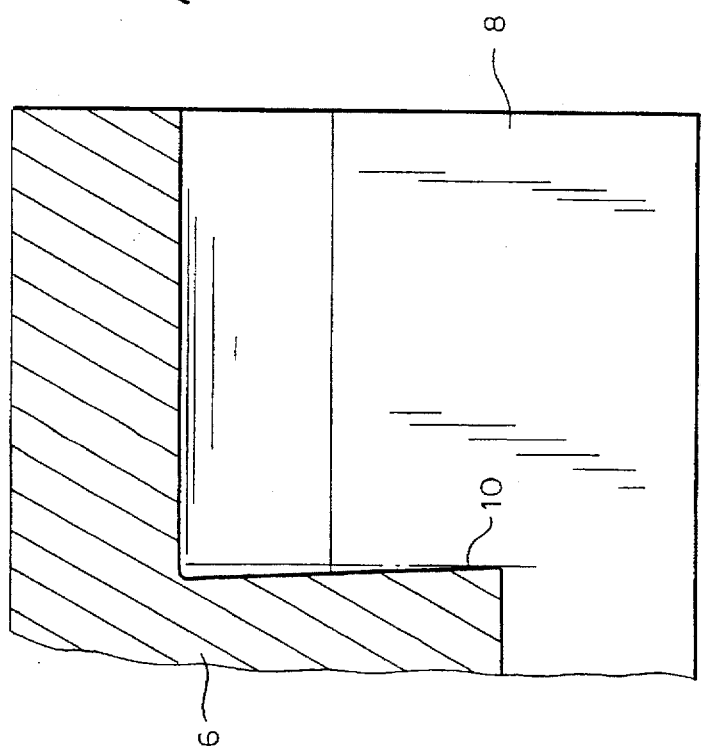

In order to restrict the degree, to which the individual chain straps can be pivoted in relation to each other, the inner straps 2 are provided with stop faces 10 in the vicinity of the guide grooves 6. These stop faces 10 run up against the corresponding stops 11 arranged in the vicinity of the guide recesses 7 of the outer strap 3. As can be seen from the section view in FIG. 4, the stop faces 10 are slightly undercut. The stops 11 are likewise provided with such undercuts. The undercuts cause the guide ribs 6 and guide recesses 7 to be drawn together when the chain straps 2, 3 are subjected to a load and when the chain straps 2, 3 are pivoted in relation to each other.

As can be seen from FIG. 1, the cross-member 4 displays wing-like wider parts 12 at its ends. These wider, or thicker parts 12, of the cross-member 4 are selected in such a way that they extend into the overlapping areas of the chain straps 2, 3. When the power transmission chain 1 is assembled, the cross-members 4 overlap two chain straps 2, 3 arranged in the same plane, thus yielding additional integrity of the strap connection.

List of Reference Numbers

1 Power transmission chain
2 Inner strap
3 Outer strap
4 Cross-member
5 Studs
6 Guide ribs
7 Guide recesses
8 Thicker area
9 Inward-facing surface
10 Stop faces
11 Stops
12 Wider parts

I claim:

1. Power transmission chain for guiding cables, hoses and the like, including chain straps (2,3) which include means to be connected in detachable fashion by upper and lower cross-members (4), which are assembled in two parallel strands and overlap each other and can be angled, where a part of the chain strap arranged on an inside of an area of mutual overlap includes a protruding peg on an outer side thereof which engages a circular recess located on an inner side of the outer chain strap and inward-facing studs roughly halfway along a pitch length of the chain straps for receiving the cross-members, wherein inner and outer straps (2 and 3) alternate, lying opposite each other in each chain strand, which are positioned flush to center sections (8) in areas of overlap and wherein cross-members (4) are attached to the outer straps (3) end sections of which include dimension means to overlap the overlap area of the adjacent inner straps (2) and act as a stop to prevent the chain straps (2, 3) separating transverse to the direction of travel.

2. The power transmission chain according to claim 1, wherein the chain straps (2, 3) are mirror-symmetrical in relation to a center plane running through a center of the chain strap (2, 3) perpendicularly to the longitudinal axis of the chain.

3. The power transmission chain according to claim 1, in which the chain straps (2, 3) include matching guide ribs (6) and guide recesses (7) in the area of their mutual overlap, where the guide ribs (6) display stop faces (10) and the guide recesses (7) display corresponding stops (11), wherein the stops (11) and stop faces (10) each display a slight undercut.

* * * * *